United States Patent
Kajio et al.

(10) Patent No.: US 8,245,357 B2
(45) Date of Patent: Aug. 21, 2012

(54) ASSIST GRIP

(75) Inventors: Hideki Kajio, Toyota (JP); Shouji Kawakami, Toyota (JP); Kazuhiro Kawamura, Anjo (JP); Yoshiyuki Sakuma, Aichi-ken (JP)

(73) Assignees: Howa Plastics Co., Ltd., Toyota-Shi, Aichi-Ken (JP); Toyoda Gosei Co., Ltd., Toyota-Shi, Aichi-Ken (JP)

( * ) Notice: Subject to any disclaimer, the term of this patent is extended or adjusted under 35 U.S.C. 154(b) by 315 days.

(21) Appl. No.: 12/591,323

(22) Filed: Nov. 17, 2009

(65) Prior Publication Data

US 2010/0175220 A1 Jul. 15, 2010

(30) Foreign Application Priority Data

Jan. 9, 2009 (JP) ................... 2009-003989

(51) Int. Cl.
*A45C 13/22* (2006.01)
(52) U.S. Cl. ........................................................ 16/444
(58) Field of Classification Search .................. 16/444, 16/445, 418, 412, 438, 295, 304, 306, 307; 296/39.1, 214, 210
See application file for complete search history.

(56) References Cited

U.S. PATENT DOCUMENTS

| | | | | |
|---|---|---|---|---|
| 4,856,141 A * | 8/1989 | Sassenberg | | 16/250 |
| 5,920,957 A * | 7/1999 | Wagner | | 16/408 |
| 5,975,606 A * | 11/1999 | Forbes et al. | | 296/1.02 |
| 6,397,435 B1 * | 6/2002 | Gosselet | | 16/438 |
| 6,467,130 B2 * | 10/2002 | Kurachi et al. | | 16/438 |
| 6,643,897 B2 * | 11/2003 | Chang | | 16/248 |
| 6,708,371 B2 * | 3/2004 | Belchine, III | | 16/386 |
| 7,103,939 B2 * | 9/2006 | Belchine et al. | | 16/412 |
| 2002/0020042 A1 * | 2/2002 | Kurachi et al. | | 16/438 |
| 2002/0021014 A1 * | 2/2002 | Sakuma et al. | | 296/1.1 |
| 2003/0126718 A1 * | 7/2003 | Yamamoto et al. | | 16/110.1 |
| 2008/0098563 A1 * | 5/2008 | Lee et al. | | 16/110.1 |
| 2009/0133219 A1 * | 5/2009 | Lowry et al. | | 16/304 |

FOREIGN PATENT DOCUMENTS

| | | |
|---|---|---|
| JP | A-2005-138823 | 6/2005 |
| JP | A-2009-501663 | 1/2009 |

* cited by examiner

*Primary Examiner* — Chuck Y. Mah

(74) *Attorney, Agent, or Firm* — Ingrassia Fisher & Lorenz, P.C.

(57) ABSTRACT

An assist grip of the present invention includes a grip body provided at both side base portions thereof with hinge recess portions and a hinge portion rotatably and pivotally supported in each of the hinge recess portions of both sides, and is fixed via the hinge portion to a to-be-fixed portion in an automobile. In a pivot support portion of the hinge portion, an outer support piece and an inner support piece are provided at a distance from each other, and between the inner support piece and the outer support piece, a torsion coil spring stored in a spring case is inserted. One end portion of the torsion coil spring is locked to an inside of the spring case, and the other end portion of the torsion coil spring projects from the spring case and is locked to a part of the grip body.

6 Claims, 8 Drawing Sheets

ASSIST GRIP

BACKGROUND OF THE INVENTION

1. Field of the Invention

The present invention relates to an assist grip to be attached to a sealing surface or the like in an automobile cabin, and more particularly, to an assist grip a grip body of which is rotatably fixed to a to-be-fixed portion in an automobile via a hinge portion.

2. Description of Related Art

To a sealing surface in an automobile cabin, an assist grip is attached to allow a passenger to support his/her body in the cabin. As assist grips of this type, ones having such a structure that recess portions are formed at both sides of a grip body, a hinge portion is rotatably attached in the recess portion, and the grip body is rotatably mounted via the hinge portion have been mounted on various automobiles.

On the hinge portion of an assist grip of this type, as described in, for example, Japanese Published Patent Application No. 2005-138823 A, a torsion coil spring for urging around a hinge shaft thereof is mounted so as to, by a spring force of the torsion coil spring, urge the grip body to an unused position against the hinge portion.

The torsion coil spring to be mounted on the hinge portion is usually arranged between a pair of support pieces provided in a projecting manner on a lower portion of the hinge portion, and is mounted in a space between the support pieces, with one end of the spring being engaged with the hinge portion, and the other end of the spring being engaged with the grip body.

The torsion coil spring, at the time of assembly, while urging the grip body up to the unused position against the hinge portion, is to be attached between a pair of support pieces on the lower portion of the hinge portion, however, the torsion coil spring needs to be oriented in a predetermined direction as its direction and mounted being urged in a torsional state, and thus a work for mounting a small-sized torsion coil spring into such a configuration by hand is troublesome and difficult work.

Moreover, the space between the support pieces of the hinge portion in the hinge recess portion of the grip body is large as compared to an external shape of the torsion coil spring, and a considerable clearance is interposed around the spring. Therefore, the torsion coil spring inserted between the support pieces is likely to be mounted obliquely shifted from an axis center position of the hinge shaft in terms of a mounted state thereof.

Therefore, when the torsion coil spring is attached in an inclined manner between the pair of support pieces of the hinge portion, it is difficult to impart a constant torsional torque to the hinge portion in a torsional direction thereof, and rotational torque between the hinge portion and the grip body by the torsion coil spring fluctuates for every product, so that it becomes difficult to manage the rotational torque of the hinge portion at a previously set constant value.

In addition, there has been a problem such that, when the torsion coil spring is attached with its axis obliquely shifted with respect to the hinge shaft of the hinge portion on which the torsion coil spring is mounted, noise is likely to occur due to friction between coil wires or due to friction between the torsion coil spring and a wall surface of the hinge recess portion of the grip body when the grip body is operated to rotate with respect to the hinge portion.

SUMMARY OF THE INVENTION

It is an object of the present invention to provide an assist grip that allows easily mounting a torsion coil spring for urging a grip body in a rotating direction on a hinge portion, and capable of stably imparting an appropriate spring force of the torsion coil spring to the grip body.

The object of the present invention can be achieved by an assist grip constructed as follows.

More specifically, the assist grip of the present invention is an assist grip including a grip body provided at both side base portions thereof with hinge recess portions and a hinge portion rotatably and pivotally supported in each of the hinge recess portions of both sides, and is to be fixed to a to-be-fixed portion in an automobile via the hinge portion, and in a pivot support portion of the hinge portion, an outer support piece and an inner support piece are provided at a distance from each other, a torsion coil spring stored in a spring case is inserted between the inner support piece and the outer support piece, one end portion of the torsion coil spring is locked to an inside of the spring case, and the other end portion of the torsion coil spring projects from the spring case and is locked to a part of the grip body.

According to this invention, when mounting a torsion coil spring between the inner support piece and the outer support piece of the hinge portion, the torsion coil spring can be simply attached in a manner of inserting a spring case storing the torsion coil spring between the inner support piece and the outer support piece thereof. Moreover, the torsion coil spring can be simply mounted by mere insertion in the spring case in accordance with the shape thereof, and can thus be simply attached at an appropriate position without being attached in an incorrect direction, as compared with when the torsion coil spring is solely attached between the inner support piece and the outer support piece. Moreover, the torsion coil spring, when being twisted in response to a rotation of the grip body, retains an appropriate shape in the spring case without inclining, and can therefore impose a steady rotational torque to the grip body, and further, the generation of noise when coil wires cause friction therebetween can be prevented.

In the above-mentioned assist grip, it is preferable that a case body of the spring case has an internal shape conforming to an external shape including a circular cylindrical-shaped coil portion of the torsion coil spring and one end portion thereof, and is formed with a cross section being in a non-circular irregular shape.

According to this assist grip, the case body of the spring case is formed with an internal shape conforming to an external shape of the coil spring, and thus, when inserting the torsion coil spring in the spring case, the torsion coil spring can be even more simply attached at an appropriate position without being attached in an incorrect direction.

In the above-mentioned assist grip, it is preferable that the case body of the spring case is formed in a cylindrical shape closed at one end, an inner locking portion to which the one end portion of the torsion coil spring is locked is provided in the case body, a guide groove for projecting the other end portion of the torsion coil spring from the spring case is provided along a circumferential direction, and the other end portion projecting outside from the guide groove is locked to a part of the grip body.

According to this assist grip, the torsion coil spring can be inserted in the spring case so as to appropriately generate its torsional spring force, and when the torsion coil spring is twisted at rotation of the grip body, one end portion and the other end portion of the spring are locked to generate a torsional spring force, so that a rotational torque can be imparted to the grip body. Moreover, even at repeated rotation of the grip body, the torsion coil spring can be prevented from coming off to reliably generate a steady urging force in the grip body.

Further, in the above-mentioned assist grip, it is preferable that the guide groove is formed with a guide groove entrance oriented to an open end, and the guide groove entrance is formed inclined in a shape narrowing toward the inside.

According to this assist grip, when inserting the torsion coil spring in the spring case from its opening end, the other end of the torsion coil spring can be allowed to simply enter the guide groove through the guide groove entrance, and the guide groove entrance is formed inclined in a shape narrowing toward the inside, and thus the other end portion of the torsion coil spring that once entered the guide groove is prevented from coming off.

Further, in the above-mentioned assist grip, it is preferable that a boss hole is provided at an inside of an axis center position of the outer support piece serving as the pivot support portion of the hinge portion, a boss is provided in a projecting manner on an end face of the case body of the spring case, and the boss of the spring case is fitted in the boss hole of the outer support piece to mount the spring case between the inner support piece and the outer support piece of the hinge portion.

According to this assist grip, the spring case storing the torsion coil spring can be simply mounted in axial alignment with the axis center position between the inner support piece and the outer support piece of the hinge portion.

Further, in the above-mentioned assist grip, it is preferable that the spring case is integrally molded of a colored synthetic resin.

According to this assist grip, integrally molding the spring case of a colored synthetic resin facilitates coloring, as compared to when the torsion coil spring itself is colored by painting and the like, and coloring the spring case allows improvising the assist grip in design. Further, molding using a synthetic resin of a different color for a spring case of a different type and thereby changing the color of the spring case allows easily performing parts management.

Thus, according to the assist grip constructed as above, the spring case storing the torsion coil spring can be simply attached at an appropriate position between the inner support piece and the outer support piece of the hinge portion, and at rotation of the grip body, a steady rotational torque can be imparted thereto, and the generation of noise when coil wires cause friction therebetween can be prevented.

DESCRIPTION OF THE PREFERRED EMBODIMENTS

Figure 1:
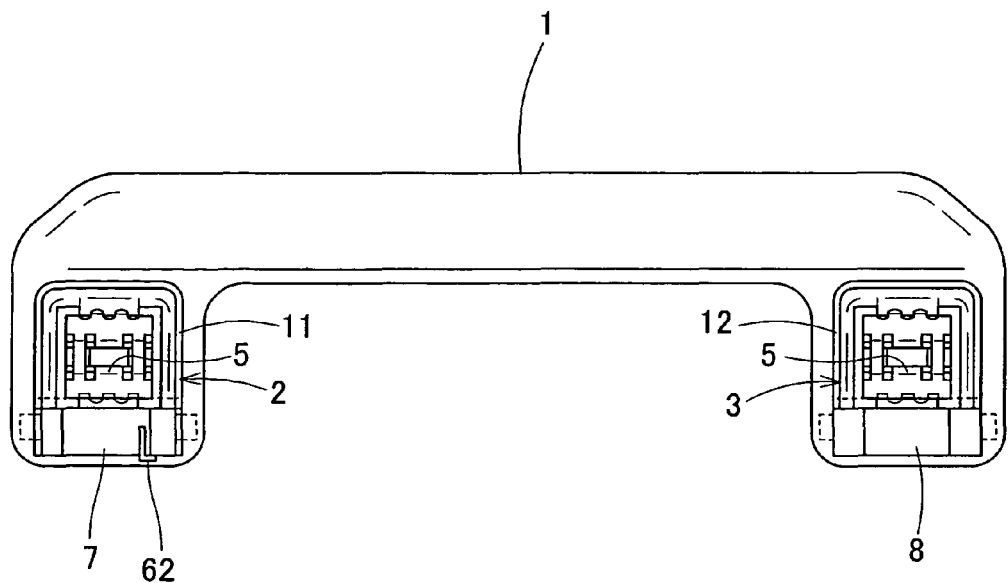
FIG. 1 is a back view of an assist grip showing a first embodiment of the present invention.

Hereinafter, the present invention will be described based on embodiments shown in the drawings. However, the present invention is by no means limited to the embodiments. All modifications within the requirements of the claims or equivalents thereof with respect to the requirements should be included in the scope of the claims.

Figure 2:
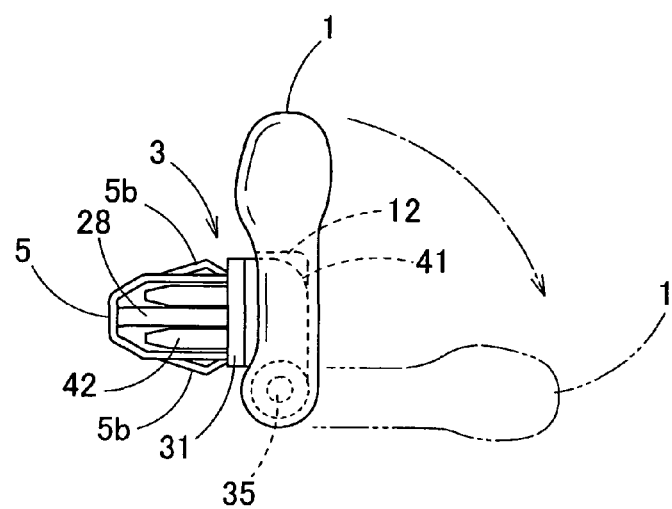
FIG. 2 is a left side view thereof.
Figure 3:
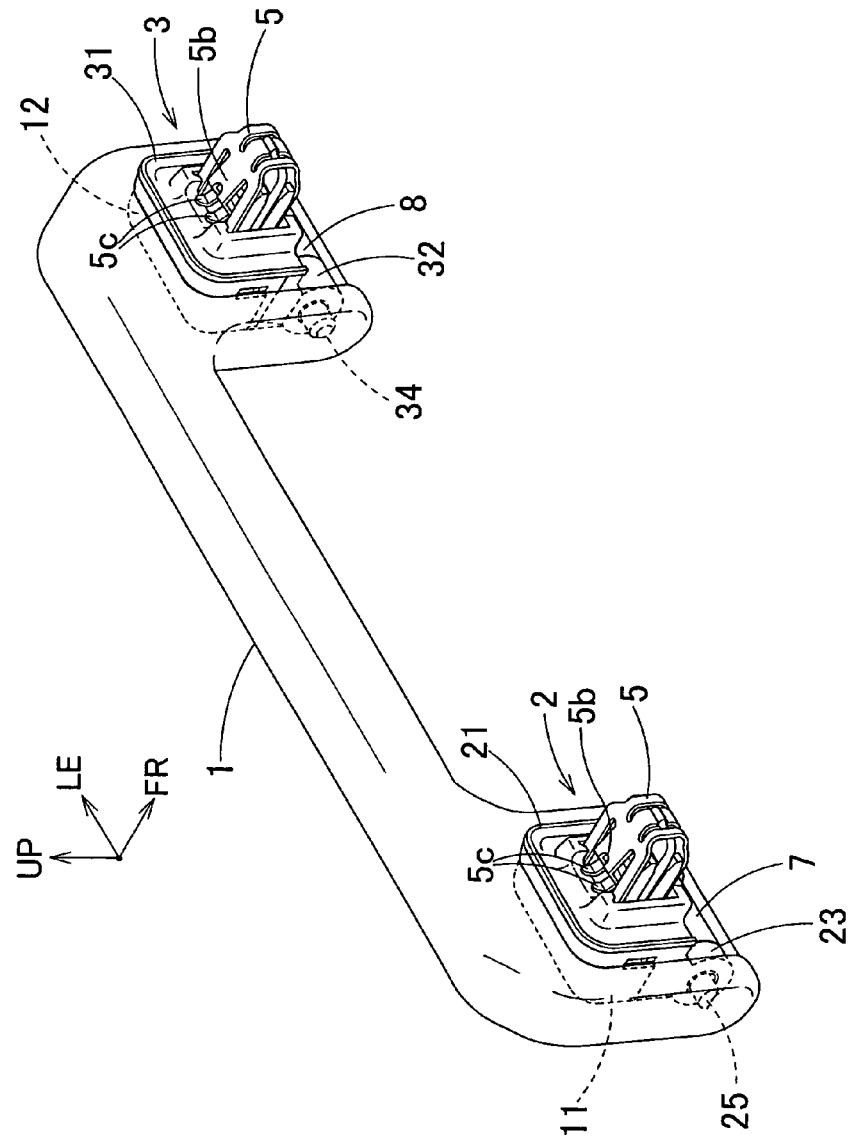
FIG. 3 is a perspective view from the back of the same assist grip.
Figure 4:
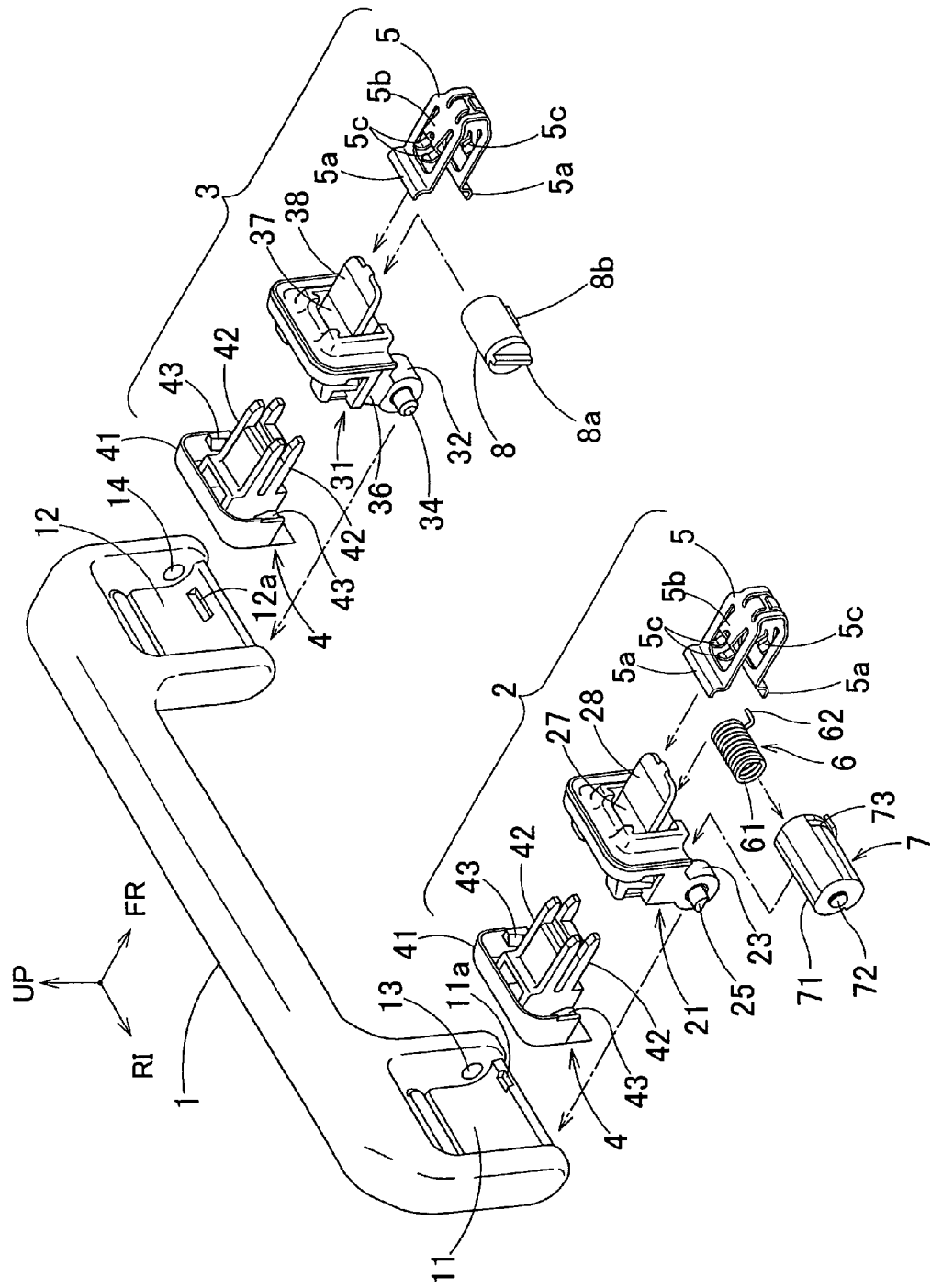
FIG. 4 is an exploded perspective view from the back of the same assist grip.
Figure 5:
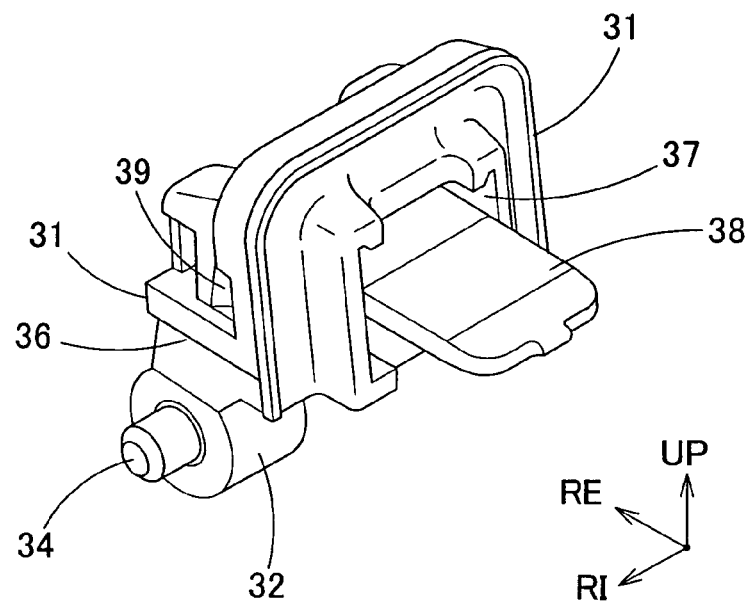
FIG. 5 is a perspective view from the back of a hinge body 31.

FIG. 1 shows a back view of an assist grip for an automobile, FIG. 2 shows a left side view thereof, FIG. 3 shows a perspective view from the back thereof, and FIG. 4 shows an exploded perspective view thereof. In addition, the left, right, up, and down to be used in the following description indicate the left, right, up, and down when an assist grip in a mounted posture is viewed from the front, respectively, and an arrow FR shown by illustration indicates the front direction of an assist grip, and an arrow LE, the left direction, and an arrow RI, the right direction, and an arrow UP, the up direction, and an arrow RE, the rear direction.

As shown in FIG. 1 to FIG. 4, a grip body 1 is integrally molded of a synthetic resin in a grip shape, and on a back surface of a base portion provided at both left and right ends of the grip body 1, a substantially rectangular-shaped hinge recess portion 11, 12 is formed. At both left and right side wall portions in the hinge recess portions 11, 12 of both sides, boss holes 13, 13, 14, 14 are formed one pair each, and an inner boss 24 and an outer boss 25 or an inner boss 34 and an outer boss 35 of a hinge portion 2, 3 to be described later are fitted in the boss holes 13, 13, 14, 14, so that each hinge portion 2, 3 is rotatably and pivotally supported with respect to the grip body 1. Because the pair of the hinge portions 2, 3 are fixed to an automobile body, the grip body 1 is made relatively rotatable with respect to the hinge portions 2, 3 between an unused state and a used state.

The hinge portion 2 and the hinge portion 3 being paired are formed in mutually mirror symmetrical shapes, and as shown in FIG. 4, the right hinge portion 2 is composed of a hinge body 21, an attachment clip 5 that is attached to the hinge body 21 by fitting in from a back side thereof, and fitted in a rectangular hole of the body (not shown) to be locked, a cover 4 that is fitted to the hinge body 21 in a manner covering a front side thereof, for making a clip support portion 42 enter a rectangular opening portion 27 in the hinge body 21 to support the attachment clip 5 from inside, a spring case 7 that is interposed between an inner support piece 22 and an outer support piece 23 provided in a projecting manner on a lower portion of the hinge body 21, and a torsion coil spring 6 that is stored in the spring case 7.

The left hinge portion 3, likewise, is composed of a hinge body 31, an attachment clip 5 that is attached to the hinge body 31 by fitting in from a back side thereof, and fitted in a rectangular hole of the body (not shown) to be locked, a cover 4 that is fitted to the hinge body 31 in a manner covering a front side thereof, for making a clip support portion 42 enter a rectangular opening portion 37 in the hinge body 31 to support the attachment clip 5 from inside, and an oil damper 8 that is inserted between an inner support piece 32 and an outer support piece 33 provided in a projecting manner on a lower portion of the hinge body 31, for imparting a rotational load to the grip body 1.

Figure 6:
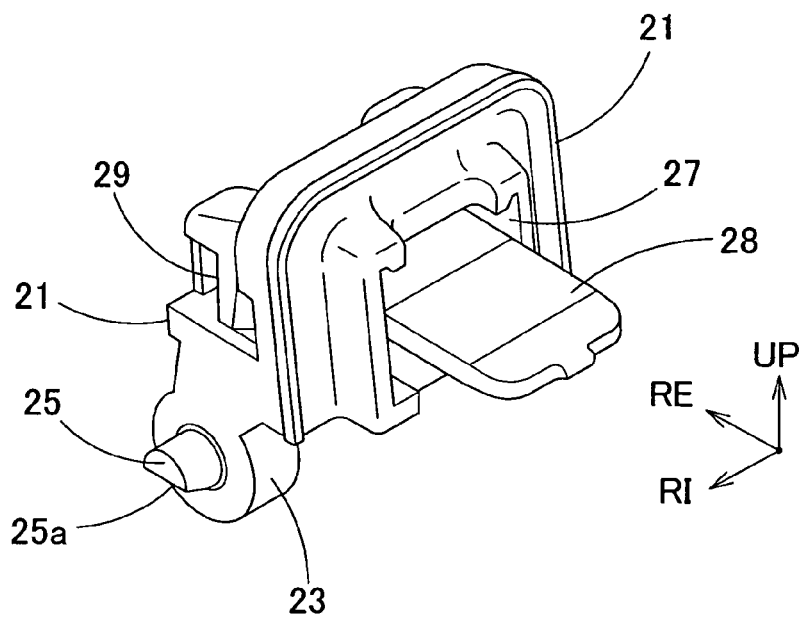
FIG. 6 is a perspective view from the back of a hinge body 21.
Figure 8:
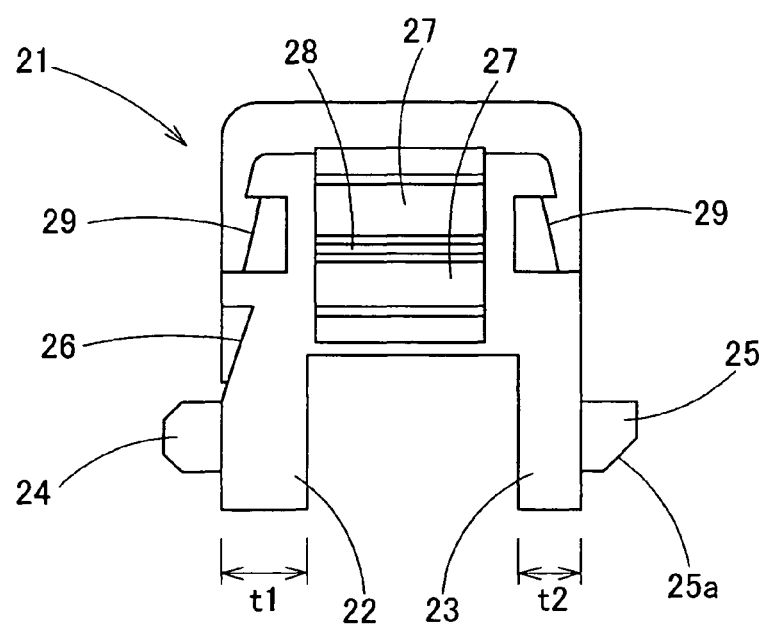
FIG. 8 is a front view of the hinge body 21.
Figure 11:
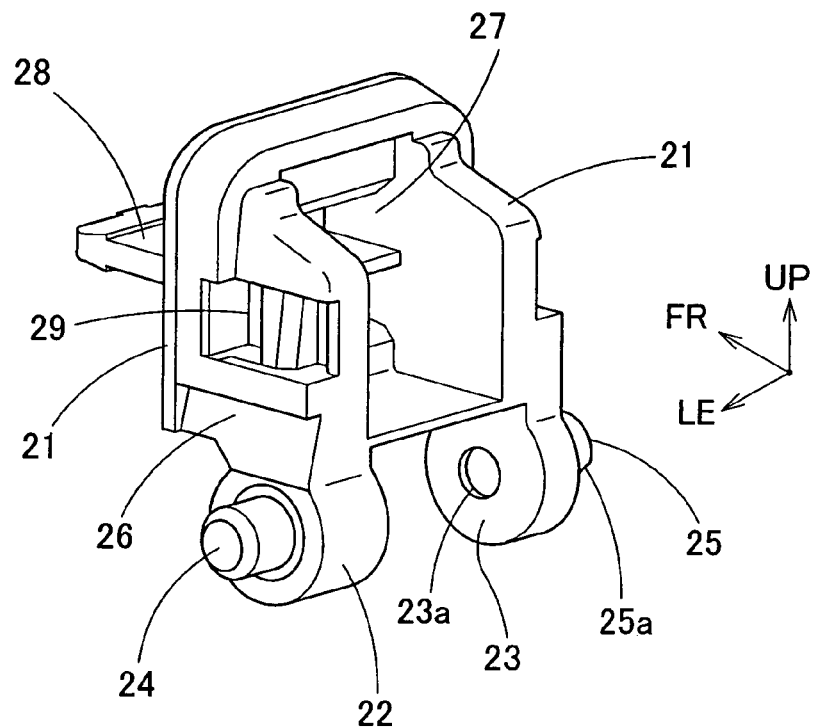
FIG. 11 is a perspective view from obliquely upward of the front of the hinge body 21.
Figure 12:
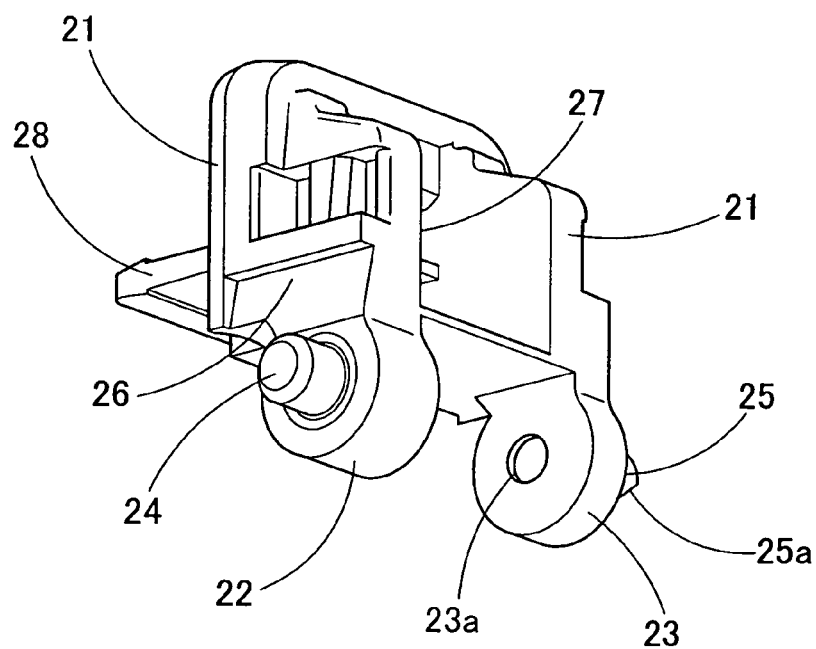
FIG. 12 is a perspective view from obliquely downward of the front of the hinge body 21.

The hinge body 21 of the right hinge portion 2 is integrally molded of a synthetic resin in a shape, as shown in FIG. 6. FIG. 8, FIG. 11, and FIG. 12, with the inner support piece 22 and the outer support piece 23 being provided in a projecting manner on a lower portion thereof, the rectangular opening portion 27 being provided substantially in the center thereof, and a central support plate 28 for supporting the attachment clip 5 being provided in a projecting manner, from a central portion of the rectangular opening portion 27 toward a back side. The inner boss 24 is provided in a projecting manner as a hinge shaft on an outer surface (a left-hand side surface of FIG. 8) of the inner support piece 22 provided in a downwardly projecting manner, while the outer boss 25 is provided in a projecting manner as a hinge shaft on an outer surface (a right-hand side surface of FIG. 8) of the outer support piece 23. The inner boss 24 of the inner support piece 22 and the outer boss 25 of the outer support piece 23 are rotatably fitted in the boss holes 13, 13 drilled in both side walls of the hinge recess portion 11 of the grip body 1.

Moreover, as shown in FIG. 8, the inner support piece 22 of the hinge body 21 is formed with a thickness t1 thicker than a thickness t2 of the outer support piece 23 thereof, and the outer support pierce 23 is formed with the thickness t2 thinner than the thickness t1 of the inner support piece 22, and when fitting the outer boss 25 into the boss hole 13, the outer support piece 23 is warped to allow fitting in. Moreover, forming the inner support piece 22 with the thickness t1 thicker than the thickness t2 of the outer support piece 23 makes it possible, when a load is imposed to the inner support piece 22 and the inner boss 24 of the hinge portion 2 via the grip body 1 in use of the assist grip, to reliably support the load.

On the other hand, a lower tip portion of the outer boss 25 provided in a projecting manner on the outer support piece 23 is provided in an obliquely cut shape, and therein a cut-away portion 25a is formed. The cut-away portion 25a allows, at the time of assembly, when fitting the outer boss 25 into the boss hole 13, the outer boss 25 to climb over an edge portion of the hinge recess portion 11 of the grip body 1. Further, as shown in FIG. 8, FIG. 11, and FIG. 12, on a basal (upper) outer surface of the inner support piece 22 of the hinge body 21, a notched groove 26 is formed, and the notched groove 26 allows, when fitting the hinge portion 2 into the hinge recess portion 11 of the grip body 1, the edge portion of the hinge recess portion 11 to enter the notch groove 26 so that the inner boss 24 and the outer boss 25 can fit in the boss holes 13, 13.

A cover locking portion 29 is formed at both side portions of the hinge body 21, so that, when fitting the cover 4 to be described later to a front side of the hinge body 21, a locking claw 43 on the cover 4 is locked thereto. Moreover, the rectangular opening portion 27 formed substantially in a central portion of the hinge body 21 is formed in a shape that allows, as shown in FIG. 4 etc., inserting from a back side thereof the attachment clip 5 to be described later as well as formed in a shape that allows, when fitting the cover 4, inserting the clip support portion 42 provided in a projecting manner on a back side of the cover 4, and substantially in the center of the rectangular opening portion 27, the central support plate 28 is horizontally provided in a projecting manner. The attachment clip 5 is inserted in the rectangular opening portion 27 of the hinge body 21 from the back to cover the central support plate 28 from above and below, and an engaging portion 5a of the tip of the attachment clip 5 is engaged inside thereof.

The hinge body 31 of the left hinge portion 3 is integrally molded of a synthetic resin, as shown in FIG. 5, FIG. 7, FIG. 9, and FIG. 10, with the inner support piece 32 and the outer support piece 33 being provided in a projecting manner on a lower portion thereof, the rectangular opening portion 37 being provided substantially in the center thereof, and a central support plate 38 for supporting the attachment clip 5 being provided in a projecting manner, from a central portion of the rectangular opening portion 37 toward a back side. The inner boss 34 is provided in a projecting manner as a hinge shaft on an outer surface (a right-hand side surface of FIG. 7) of the inner support piece 32 provided in a downwardly projecting manner, while the outer boss 35 is provided in a projecting manner as a hinge shaft on an outer surface (a left-hand side surface of FIG. 7) of the outer support piece 33, and the inner support piece 32 and the outer support piece 33 are rotatably fitted in the boss holes 14, 14 drilled in both side walls of the hinge recess portion 12 of the grip body 1.

Figure 7:
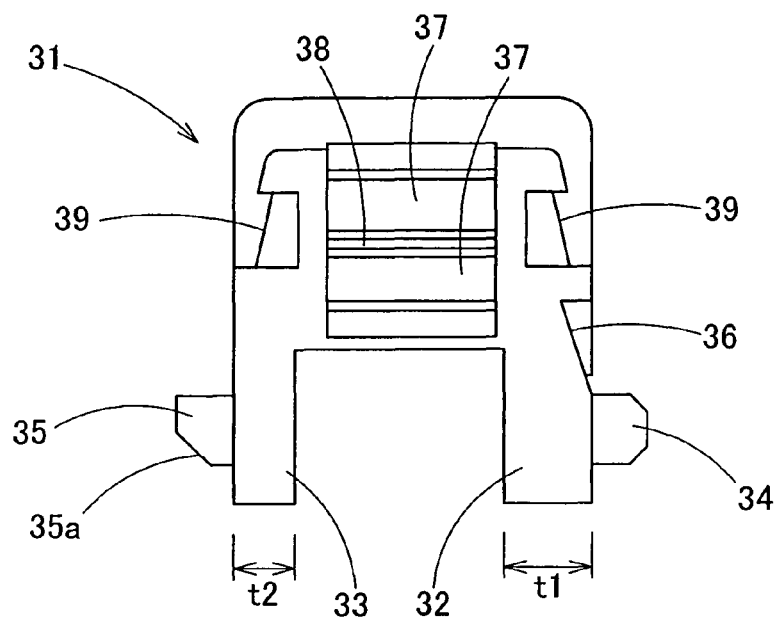
FIG. 7 is a front view of the hinge body 31.

Moreover, as shown in FIG. 7, the inner support piece 32 of the hinge body 31 is formed with a thickness t1 thicker than a thickness t2 of the outer support piece 33 thereof, and the outer support pierce 33 is formed with the thickness t2 thinner than the thickness t1 of the inner support piece 32, and when fitting the outer boss 35 into the boss hole 14, the outer support piece 33 is warped to allow fitting in. Moreover, forming the inner support piece 32 with the thickness t1 thicker than the thickness t2 of the outer support piece 33 makes it possible, when a load is imposed to the inner support piece 32 and the inner boss 34 of the hinge portion 3 via the grip body 1 in use of the assist grip, to reliably support the load.

Figure 9:
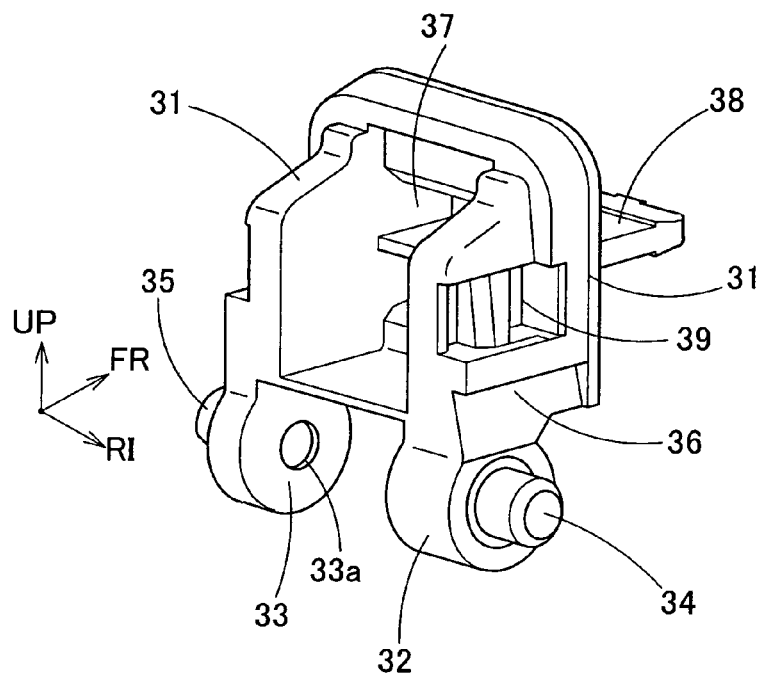
FIG. 9 is a perspective view from obliquely upward of the front of the hinge body 31.
Figure 10:
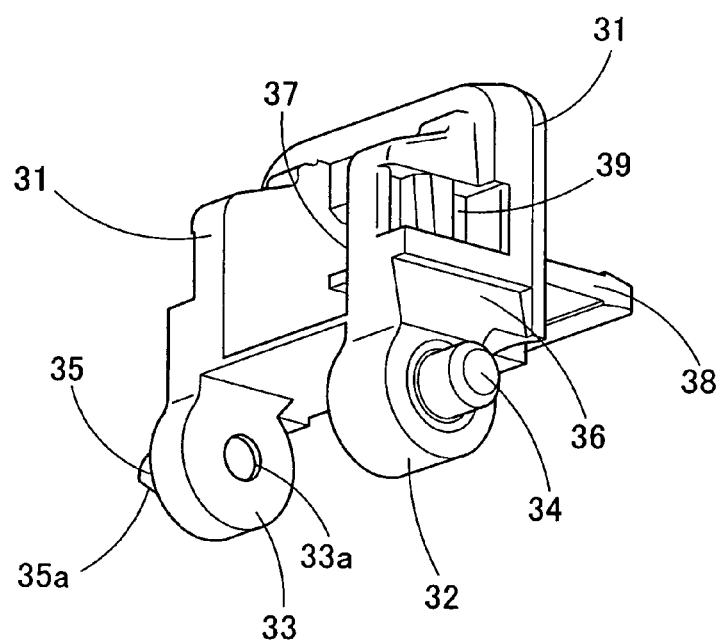
FIG. 10 is a perspective view from obliquely downward of the front of the hinge body 31.

On the other hand, a lower tip portion of the outer boss 35 provided in a projecting manner on the outer support piece 33 is provided in an obliquely cut shape, and therein a cut-away portion 35a is formed. The cut-away portion 35a enables, at the time of assembly, when fitting the outer boss 35 into the boss hole 14, the outer boss 35 to climb over an edge portion of the hinge recess portion 12 of the grip body 1. Further, as shown in FIG. 7, FIG. 9, and FIG. 10, on a basal (upper) outer surface of the inner support piece 32 of the hinge body 31, a notched groove 36 is formed, and the notched groove 36 allows, when fitting the hinge portion 3 into the hinge recess portion 12 of the grip body 1, the edge portion of the hinge recess portion 12 to enter the notch groove 36 and the hinge portion 3 to incline so that the inner boss 34 can fit in the boss hole 14.

A cover locking portion 39 is formed at both side portions of the hinge body 31, so that, when fitting the cover 4 to a front side of the hinge body 31, a locking claw 43 on the cover 4 is locked thereto. Moreover, the rectangular opening portion 37 formed substantially in a central portion of the hinge body 31 is formed in a shape that allows, as shown in FIG. 4 etc., inserting from a back side thereof the attachment clip 5 as well as formed in a shape that allows, when fitting the cover 4, inserting the clip support portion 42 provided in a projecting manner on a back side of the cover 4, and substantially in the center of the rectangular opening portion 37, the central support plate 38 is horizontally provided in a projecting manner. The attachment clip 5 is inserted in the rectangular opening portion 37 of the hinge body 31 from the back to cover the central support plate 38 from above and below, and an engaging portion 5a of the tip of the attachment clip 5 is engaged inside thereof.

As above, with the aforementioned hinge body 21, 31 being rotatably fitted in the hinge recess portion 11, 12 of the grip body 1, the attachment clip 5 is fitted into the hinge body 21, 31, and the attachment clip 5 is formed, as shown in FIG. 4, by bending a metal with spring elasticity into a substantially U-shape, and formed at a tip portion thereof is an engaging portion 5a, 5a to be engaged with the inside of the hinge body 21, 31, by being bent in an L-shape.

Further, formed at both sides of the attachment clip 5 in a cutting and erecting manner is a bulging portion 5*b* so as to be elastically deformable in a widening direction, and in the bulging portion 5*b*, a locking portion to be locked to an edge portion of the rectangular hole provided in a body panel (automobile body) (not shown) is formed. Further, at a tip portion of the bulging portion 5*b*, a locking claw 5*c* that, as shown in FIG. 3, is locked to an edge portion of the hinge body 21, 31 when the attachment clip 5 is mounted on the hinge body 21, 31 in a manner of inserting the same from the back side is formed as two separated parts.

The cover 4 that is mounted so as to cover the front side of the hinge body 21, 31 is, as shown in FIG. 4, composed of a cover body 41 that covers a front surface of the hinge body 21, 31 and the clip support portion 42 provided in a projecting manner on the back side of the cover body 41, and on the clip support portion 42, two pairs of pointed portions to be fitted in the inside of the attachment clip 5 are provided in a projecting manner, and at both side portions in the cover body 41, the locking claw 43 to be locked to the cover locking portion 29, 39 of the hinge body 21, 31 is provided.

For mounting the hinge portion 2, 3 on the grip body 1, first, the hinge body 21, 31 is mounted on the hinge recess portion 11, 12 of the grip body 1, and at this time, the hinge body 21, 31 causes the inner boss 24, 34 and the outer boss 25, 35 at both sides thereof to be fitted in the boss holes 13, 14 of the hinge recess portion 11, 12.

That is, for mounting the right hinge body 21 on the hinge recess portion 11 of the grip body 1, first, the hinge body 21 is inclined with respect to the hinge recess portion 11 to insert a tip portion of the inner boss 24 of the inner support piece 22 in the boss hole 13. At this time, the edge portion of the hinge recess portion 11 enters the notched groove 26 in the base portion of the inner support piece 22 to allow inserting the tip portion of the inner boss 24 in the boss hole 13.

Next, the outer support piece 23 of the hinge body 21 is depressed to make the outer boss 25 thereof enter the hinge recess portion 11. At this time, the lower tip portion of the outer boss 25 is provided as the cut-away portion 25*a*, and therefore the outer boss 25 can easily enter the hinge recess portion 11, and further, because the outer support piece 23 is formed with a relatively thin thickness, the outer support piece 23 warps in a direction to insert the outer boss 25 in the hinge recess portion 11, so that the outer boss 25 enters the hinge recess portion 11. Then, further pushing and making the outer boss 25 enter up to a middle position in the hinge recess portion 11 allows fitting the outer boss 25 in the boss hole 13.

On the other hand, for mounting the left hinge body 31 on the hinge recess portion 12 of the grip body 1, first, the hinge body 31 is inclined with respect to the hinge recess portion 12 to insert a tip portion of the inner boss 34 of the inner support piece 32 in the boss hole 14. At this time, the edge portion of the hinge recess portion 12 enters the notched groove 36 in the base portion of the inner support piece 32 to allow inserting the tip portion of the inner boss 34 in the boss hole 14.

Next, the outer support piece 33 of the hinge body 31 is depressed to make the outer boss 35 thereof enter the hinge recess portion 12. At this time, the lower tip portion of the outer boss 35 is provided as the cut-away portion 35*a*, and therefore the outer boss 35 can easily enter the hinge recess portion 12, and further, because the outer support piece 33 is formed with a relatively thin thickness, the outer support piece 33 warps in a direction to insert the outer boss 35 in the hinge recess portion 12, so that the outer boss 35 enters the hinge recess portion 12. Then, further pushing and making the outer boss 35 enter up to a middle position in the hinge recess portion 12 allows fitting the outer boss 35 in the boss hole 14.

Next, between the inner support piece 22 and the outer support piece 23 of the hinge body 21 mounted on the right hinge recess portion 11, the torsion coil spring 6 for urging the grip body 1 to an unused position (a state shown by a solid line in FIG. 2) against the hinge portion 2, 3 is mounted along with the spring case 7. The torsion coil spring 6, while being stored in the spring case 7, is inserted and attached between the inner support piece 22 and the outer support piece 23.

Figure 14:
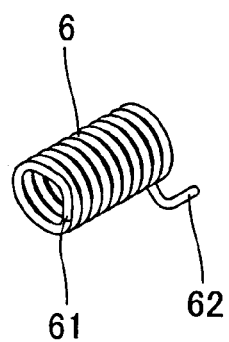
FIG. 14 is a perspective view of a torsion coil spring.

For the torsion coil spring 6, as shown in FIG. 14, one end portion 61 is formed at one end portion of a circular cylindrical-shaped coil portion, and the other end portion 62 is formed at the other end portion thereof. The one end portion 61 is formed so as to slightly project in an outer peripheral direction from an outer peripheral surface of the coil portion, and structured so as to be locked to an inner locking portion 74 formed inside the spring case 7. On the other hand, the other end portion 62 of the torsion coil spring 6 is formed projected in the outer peripheral direction from the outer peripheral surface of the coil portion as well as bent substantially at a right angle to the axially outside, and structured, with the spring being inserted in the spring case 7, so as to project outside from a guide groove 73 of the spring case 7 and be locked to a locking recess portion 11*a* in the hinge recess portion 11 of the grip body 1.

Figure 13:
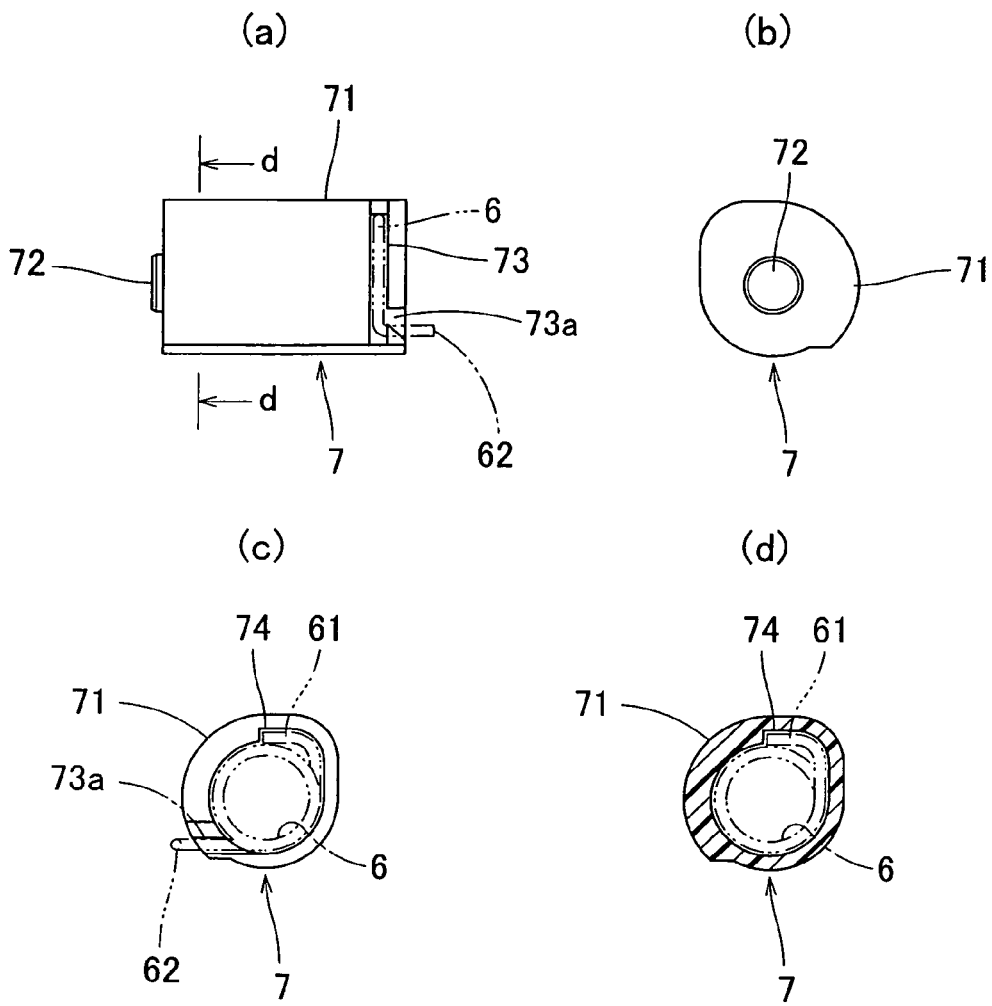
FIG. 13(*a*) is a front view of a spring case, FIG. 13(*b*) is a left side view, FIG. 13(*c*) is a right side view, and FIG. 13(*d*) is a d-d sectional view.

For the spring case 7, as shown in FIG. 4 and FIG. 13, its case body 71 has an internal shape conforming to an external shape including the circular cylindrical-shaped coil portion of the torsion coil spring 6 and one end portion 61 thereof, and is formed with a cross section being in a non-circular irregular shape. Moreover, the case body 71 of the spring case 7 is formed in a cylindrical shape closed at one end, and at a closed portion side in the case body 71, the inner locking portion 74 to which the one end portion 61 of the torsion coil spring 6 is locked is formed.

Further, at the side opposite to the inner locking portion 74 of the case body 71 of the spring case 7, that is, an open end side of the case body 71, the guide groove 73 for guiding while projecting the other end portion 62 of the torsion coil spring 6 from the spring case 7 is provided along a circumferential direction. The guide groove 73 is formed with a guide groove entrance 73*a* oriented to the open end, which provides a structure to allow, when inserting the torsion coil spring 6 in the spring case 7 from its open end, the other end portion 62 thereof to easily enter the guide groove 73 through the guide groove entrance 73*a*. Moreover, as shown in FIG. 13, the guide groove entrance 73*a* is formed inclined in a shape narrowing toward the inside, thereby preventing the other end portion 62 of the torsion coil spring 6 that once entered the guide groove 73 from coming off.

When inserting the torsion coil spring 6 in the spring case 7, the torsion coil spring 6 is inserted from the opening end of the case, and because, as shown in FIG. 4 and FIG. 13, the cylindrical-shaped spring case 7 is formed with a cross-sectional shape almost the same as an end face shape (side surface shape) of the coil portion including the one end portion 61 of the torsion coil spring 6, inserting the torsion coil spring 6 in the spring case 7 from the one end portion 61 side thereof and making the other end portion 62 thereof enter the guide groove 73 through the guide groove entrance 73*a* allows simply attaching the torsion coil spring 6 at an appropriate position in the spring case 7 without attaching the torsion coil spring 6 in an incorrect direction. Moreover, as above, the guide groove entrance 73*a* is inclined in a shape narrowing toward the inside, and therefore, the other end portion 62 of the torsion coil spring 6 having entered the guide groove 73 through the guide groove entrance 73*a* never comes off from the guide groove entrance 73*a*.

On the other hand, an end face (left side surface) of the closed side of the spring case 7 is provided in a projecting manner at an axis center position thereof with a boss 72, which is structured, when mounting the spring case 7 between the outer support piece 23 and the inner support piece 22 of the hinge portion 21, so as to be fitted in a boss hole 23a formed at an axis center position of the outer support piece 23 as shown in FIG. 11 and FIG. 12.

Then, in assembly, the spring case 7 storing the torsion coil spring 6 is arranged on the same axis center as that of the inner boss 24 and the outer boss 25 of the hinge body 21, and the boss 72 provided in a projecting manner on an outer side surface of the spring case 7 is fitted in the boss hole 23a provided at the inside of the outer support portion 23. The one end portion 61 of the torsion coil spring 6 stored in the spring case 7 is locked to the inner locking portion 74 provided in the spring case 7, and the other end portion 62 of the torsion coil spring 6 projects outside from the guide groove 73, and is locked to the locking recess portion 11a provided in the hinge recess portion 11 of the grip body 1. As a result, the torsion coil spring 6, while being stored in the spring case 7, is disposed between the outer support piece 23 and the inner support piece 22 of the hinge recess portion 11 so as to urge the grip body 1 into an unused state against the hinge body 21.

In use of the assist grip, the grip body 1 rotates via the hinge portion 2, 3, and at this time, the torsion coil spring 6 causes friction between its metal wires, and the other end portion 62 thereof moves within the guide groove 73 of the spring case 7, and therefore, for prevention of noise and wear, the torsion coil spring 6 in the case is greased. However, the torsion coil spring 6 is stored in the case 7, and therefore, when mounting the torsion coil spring 6 and the case 7 on the hinge body 21 or attaching the assist grip in an automobile, a worker can perform work without staining his/her hands.

Further, the spring case 7 is inserted between the inner support piece 22 and the outer support piece 23 with zero clearance at both side portions thereof, and this prevents the inner support piece 22 and the outer support piece 23 from alternately warping inside when the grip body 1 receives a load in use.

On the other hand, between the inner support piece 32 and the outer support piece 33 of the hinge body 31 mounted on the left hinge recess portion 12, the oil damper 8 is attached as shown in FIG. 4. The oil damper 8 is arranged on the same axis center as that of the inner boss 34 and the outer boss 35 of the hinge body 31, and a tip portion 8a of a damper shaft projecting at one side thereof is fitted with the inside of the inner support piece 32. An engaging projection portion 8b provided in a projecting manner on an outer case of the oil damper 8 is engaged with an engaging recess portion 12a provided in the hinge recess portion 12 of the grip body 1.

As a result, when the grip body 1 is rotated with respect to the hinge portion 3, the damper shaft of the oil damper 8 rotates with respect to the outer case thereof, and acts so as to impart a moderate rotational resistance. Moreover, in the same manner as above, the oil damper 8, by being inserted and arranged between the inner support piece 32 and the outer support piece 33 with zero clearance at both side portions thereof, prevents the inner support piece 32 and the outer support piece 33 from alternately warping inside when the grip body 1 receives a load in use.

Next, the attachment clips 5, 5 are attached to the hinge body 21 of the right hinge portion 2 and the hinge body 31 of the left hinge portion 3, respectively. At this time, the attachment clip 5, 5, as shown in FIG. 4, from the back side of each hinge body 21, 31, is inserted in the rectangular opening portion 27, 37 thereof, and from the front side of each hinge body 21, 31, the clip support portion 42, 42 of the cover 4, 4 is inserted in the rectangular opening portion 27, 37 thereof.

At this time, the cover 4, 4 is mounted to the front side of the hinge body 21, 31, in a temporarily fixed state (a state where the bulging portion 5b etc., of the attachment clip 5, 5 is movable when the attachment clip 5, 5 is fitted in the rectangular hole of a body panel), the attachment clip 5, 5, as shown in FIG. 3, is fitted into a back portion of the hinge body 21, 31, the engaging portion 5a, 5a thereof is engaged with the inside of the hinge body 21, 31, and the locking claw 5c thereof makes contact with a back seat portion of the hinge body 21, 31.

For attaching the assist grip to a predetermined position in an automobile cabin, the hinge portion 2, 3 at both side base portions thereof is pushed in a rectangular hole provided in a molded ceiling material and a body panel. At this time, the bulging portion 5b, 5b of the attachment clip 5, 5 contacts an edge portion of the rectangular hole and enters the rectangular hole while being elastically deformed inside (in a direction to reduce the width), and when the bulging portion 5b, 5b of the attachment clip 5, 5 is completely fitted in the rectangular hole, the edge portion of the rectangular hole of the body panel is sandwiched between the locking portion of the bulging portion 5b, 5b and a tip seat portion of the hinge body 21, 31 to reach a locked state.

Thereafter, the cover 4, 4 having been in a temporarily fixed state is pushed against the front surface of the hinge body 21, 31 to fit the locking claw 43, 43 inside thereof into each of the cover locking portions 29, 39 of both sides of the hinge body 21, 31. In this state, the clip support portion 42, 42 of the cover 4, 4 completely fits in the inside of the attachment clip 5, 5, and the attachment clip 5, 5 is strongly locked to the body panel, thus completing an attachment of the assist grip.

In use of the assist grip, a user, as shown in FIG. 2, rotates down the grip body 1 with respect to the left and right hinge portions 2, 3 for use. The grip body 1 is drawn downward at a central portion thereof by the user, and at this time, the torsion coil spring 6 is twisted against its torsional spring force at the other end portion 62 thereof by a rotation of the locking recess portion 11a of the hinge recess portion 11 in the grip body 1, and moves within the guide groove 73 of the spring case 7. As a result, the grip body 1 rotates down against the torsional spring force, and a used state of the grip body 1 is retained by the user gripping the grip body 1.

At this time, a load by the user is applied via the grip body 1 to the inner boss 24, 34 and the outer boss 25, 35 of the hinge portion 2, 3, and mainly to the inner boss 24, 34 thereof, a downward load is greatly imposed.

However, this load is received by the inner boss 24, 34 provided in a projecting manner on the inner support piece 22, 32 with a larger thickness, and moreover, the spring case 7 or the oil damper 8 is inserted as a support member between the inner support piece 22, 32 and the outer support piece 23, 33, and therefore, the inner boss 24, 34 and the inner support piece 22, 32 can reliably support the load in use without warping.

Although the load in use is also imposed in the outer boss 25, 35 mainly to an upper portion thereof, the cut-away portion 25a, 35a provided in the outer boss 25, 35 is at only the lower tip portion thereof, and thus the amount of overlap of the boss hole with respect to the outer boss 25, 35 is sufficiently secured, so that the outer boss 25, can reliably support the load in use at the upper portion thereof. Moreover, in the same manner as above, the spring case 7 or the oil damper 8 is inserted as a support member between the inner support piece 22, 32 and the outer support piece 23, 33, and therefore, warping deformation of the outer support piece 23, 23 when the outer boss 25, 35 receives a load is prevented.

On the other hand, when the user releases his/her hand from the grip body 1 in a used state of the assist grip, the grip body 1 receives an upward (counterclockwise in FIG. 2) urging force from the other end portion 62 of the torsion coil spring 6 in the spring case 7 to rotate in the same direction, and returns to an unused state (the slid line position in FIG. 2). At this time, the other end portion 62 of the torsion coil spring 6 moves along the guide groove 73 of the spring case 7 to return to the unused state position.

In addition, the spring case 7, which is integrally molded of a synthetic resin, can be molded of a systemic resin material colored in accordance with the grip body 1 etc., or with an arbitrary color. Where the colored spring case 7 is made to appear at the front side of the hinge portion 2 when the grip body 1 is brought in a used state, the assist grip as a whole can be improved in design quality by coloring the spring case 7 with an arbitrary color. Moreover, such coloring at a molding stage of the spring case 7 can be simply performed by a small number of steps, as compared to that when a torsion coil spring is painted, for example. Further, changing the color of the spring case 7 for every product allows easily performing parts management.

What is claimed is:

1. An assist grip comprising:
   a grip body including two side base portions, each having a respective hinge recess portion;
   a hinge portion rotatably and pivotally supported in each of the hinge recess portions, wherein each hinge portion is configured to be fixed to an automobile body;
   a spring case disposed between an outer support piece and an inner support piece provided at a distance from each other as a pivot support portion of said hinge portion;
   a torsion coil spring stored in said spring case, wherein one end portion of said torsion coil spring is locked to an inside of said spring case, and the other end portion of said torsion coil spring projects from said spring case and is locked to a part of said grip body such that torsional spring resistance is imparted when the grip body is rotated with respect to the automobile body;
   wherein a boss hole is provided within an inner surface of the outer support piece and serves as the pivot support portion of said hinge portion; and
   wherein a boss is provided in a projecting manner on an end face of said case body of said spring case, and the boss of said spring case is fitted in the boss hole of the outer support piece to mount said spring case between the inner support piece and the outer support piece of said hinge portion.

2. The assist grip according to claim 1, wherein a case body of said spring case has an internal shape conforming to an external shape of a circular cylindrical-shaped coil portion of said torsion coil spring and one end portion thereof, and is formed with a cross section being in a non-circular irregular shape.

3. The assist grip according to claim 2, wherein said case body of said spring case is formed in a cylindrical shape closed at one end, an inner locking portion to which the one end portion of said torsion coil spring is locked is provided in said case body, a guide groove for projecting the other end portion of said torsion coil spring from said spring case is provided along a circumferential direction, and the other end portion projecting outside from the guide groove is locked to a part of said grip body.

4. The assist grip according to claim 3, wherein said guide groove is formed with a guide groove entrance oriented to an open end, and the guide groove entrance is formed inclined in a shape narrowing toward the inside.

5. The assist grip according to claim 4, wherein said spring case is integrally molded of a colored synthetic resin.

6. An assist grip comprising:
   a grip body including two side base portions, each having a respective hinge recess portion;
   a hinge portion rotatably and pivotally supported in each of the hinge recess portions, wherein each hinge portion is configured to be fixed to an automobile body;
   a spring case disposed between an outer support piece and an inner support piece provided at a distance from each other as a pivot support portion of said hinge portion; and
   a torsion coil spring stored in said spring case, wherein one end portion of said torsion coil spring is locked to an inside of said spring case, and the other end portion of said torsion coil spring projects from said spring case and is locked to a part of said grip body such that torsional spring resistance is imparted when the grip body is rotated with respect to the automobile body;
   wherein a case body of said spring case has an internal shape conforming to an external shape of a circular cylindrical-shaped coil portion of said torsion coil spring and one end portion thereof, and is formed with a cross section being in a non-circular irregular shape;
   wherein said case body of said spring case is formed in a cylindrical shape closed at one end, an inner locking portion to which the one end portion of said torsion coil spring is locked is provided in said case body, a guide groove for projecting the other end portion of said torsion coil spring from said spring case is provided along a circumferential direction, and the other end portion projecting outside from the guide groove is locked to a part of said grip body;
   wherein said guide groove is formed with a guide groove entrance oriented to an open end, and the guide groove entrance is formed inclined in a shape narrowing toward the inside; and
   wherein a boss hole is provided at an inside of an axis center position of the outer support piece serving as the pivot support portion of said hinge portion, a boss is provided in a projecting manner on an end face of said case body of said spring case, and the boss of said spring case is fitted in the boss hole of the outer support piece to mount said spring case between the inner support piece and the outer support piece of said hinge portion.

* * * * *